United States Patent
Wei

(10) Patent No.: US 12,545,277 B2
(45) Date of Patent: Feb. 10, 2026

(54) BLIND SPOT WARNING METHOD AND ELECTRONIC DEVICE

(71) Applicant: SUTENG INNOVATION TECHNOLOGY CO., LTD., Shenzhen (CN)

(72) Inventor: Yanzhi Wei, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 29 days.

(21) Appl. No.: 18/625,200

(22) Filed: Apr. 3, 2024

(65) Prior Publication Data
US 2024/0343264 A1 Oct. 17, 2024

(30) Foreign Application Priority Data
Apr. 12, 2023 (CN) .......................... 202310383013.0

(51) Int. Cl.
*B60W 50/14* (2020.01)
*B60K 35/28* (2024.01)

(52) U.S. Cl.
CPC ............. *B60W 50/14* (2013.01); *B60K 35/28* (2024.01); *B60K 2360/178* (2024.01); *B60W 2050/146* (2013.01); *B60W 2520/06* (2013.01); *B60W 2520/10* (2013.01); *B60W 2554/402* (2020.02); *B60W 2554/4042* (2020.02); *B60W 2554/4044* (2020.02)

(58) Field of Classification Search
CPC ........... B60W 50/14; B60W 2554/402; B60W 2554/4042; B60W 2554/4044; B60W 2050/146; B60W 2520/06; B60W 2520/10; B60K 35/28; B60K 2360/178
See application file for complete search history.

(56) References Cited

U.S. PATENT DOCUMENTS

| | | | |
|---|---|---|---|
| 10,570,587 B2 * | 2/2020 | Kurokami | G06V 10/764 |
| 11,685,394 B2 * | 6/2023 | Schumacher | B60K 35/80 |
| | | | 340/961 |
| 11,760,372 B2 * | 9/2023 | Behring | B60K 35/22 |
| | | | 340/435 |
| 11,807,273 B2 * | 11/2023 | Yurdana | B60K 35/10 |
| 11,834,122 B2 * | 12/2023 | Tetsuka | G01S 13/931 |
| 12,134,385 B2 * | 11/2024 | Taniguchi | B60K 35/50 |
| 12,139,071 B2 * | 11/2024 | Chang | G06V 20/58 |

(Continued)

FOREIGN PATENT DOCUMENTS

| | | | | |
|---|---|---|---|---|
| CN | 110509847 A | * | 11/2019 | B60R 1/00 |
| CN | 111175752 A | * | 5/2020 | G01S 7/282 |

(Continued)

*Primary Examiner* — Chico A Foxx
(74) *Attorney, Agent, or Firm* — BAYES PLLC

(57) ABSTRACT

This application provides a method and an electronic device for blind spot warning. The method includes: determining the blind spot of a vehicle during travel; identifying a traffic participant in the blind spot; dividing the blind spot to obtain multiple warning regions, where the multiple warning regions have different hazard levels; determining the warning region in which the traffic participant is located among the multiple warning regions; and performing a warning corresponding to the hazard level of the warning region where the traffic participant is located.

11 Claims, 7 Drawing Sheets

(56) References Cited

U.S. PATENT DOCUMENTS

| | | | | |
|---|---|---|---|---|
| 2005/0073433 A1* | 4/2005 | Gunderson | ........... | G01S 13/931 |
| | | | | 340/903 |
| 2006/0119473 A1* | 6/2006 | Gunderson | ........... | G01S 13/878 |
| | | | | 342/126 |
| 2015/0314783 A1* | 11/2015 | Nespolo | ............ | B60W 30/0953 |
| | | | | 701/301 |
| 2020/0407001 A1* | 12/2020 | Tetsuka | .................... | B62J 50/22 |
| 2021/0107505 A1* | 4/2021 | Matsunaga | ........... | G01S 15/931 |
| 2022/0048431 A1* | 2/2022 | Braeuchle | .............. | G08G 1/166 |
| 2023/0119420 A1* | 4/2023 | Kang | ..................... | G06V 20/58 |
| | | | | 340/435 |

FOREIGN PATENT DOCUMENTS

| | | | | | |
|---|---|---|---|---|---|
| CN | 111891135 A | * | 11/2020 | ............ | B60W 50/14 |
| CN | 112249013 A | * | 1/2021 | ........ | B60W 30/0956 |
| JP | 2009184554 A | * | 8/2009 | | |
| TW | 202222621 A | * | 6/2022 | ............. | G01S 15/08 |

* cited by examiner

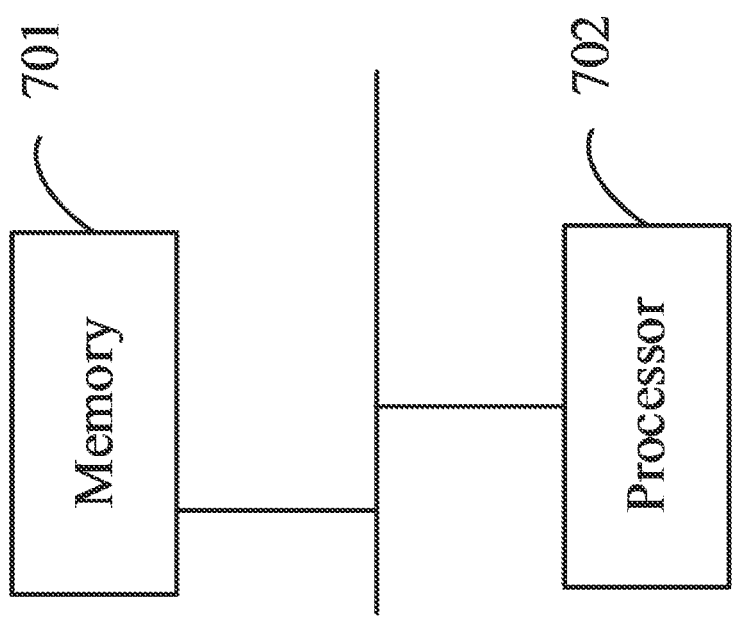

BLIND SPOT WARNING METHOD AND ELECTRONIC DEVICE

CROSS-REFERENCE TO RELATED APPLICATION

The present application claims the benefit of priority to Chinese Patent Application No. 202310383013.0, filed on Apr. 12, 2023, which is hereby incorporated by reference in its entirety.

TECHNICAL FIELD

This application relates to the field of vehicles, particularly to a method, apparatus, electronic device, and storage medium for blind spot warning in the field of vehicles.

TECHNICAL BACKGROUND

The right side area of heavy-duty trucks, dump trucks, buses, and other large vehicles is typically the driver's blind spot, and it is also one of the important reasons for traffic accidents involving large vehicles. Therefore, in order to enhance driving safety for drivers, accurately providing hazard warnings for the driver's blind spot is an urgent issue that needs to be addressed.

SUMMARY

Embodiments of this application provides a method, apparatus, electronic device, and storage medium for blind spot warning, which can accurately warn of hazards in blind spots to improve driving safety.

A blind spot warning method is provided, which includes: determining the blind spot of a vehicle during travel; identifying a traffic participant in the blind spot; dividing the blind spot to obtain multiple warning regions, where the multiple warning regions have different hazard levels; determining the warning region from the multiple warning regions in which the traffic participant is located; and performing a warning corresponding to the hazard level of the warning region where the traffic participant is located.

The blind spot of the vehicle during travel is first determined, and the traffic participant in the blind spot is identified. By dividing the blind spot to obtain multiple warning regions with different hazard levels, the warning region where the traffic participant is located is determined among the multiple warning regions. Then, a warning corresponding to the hazard level of the warning region where the traffic participant is located is performed. Since the multiple warning regions obtained by dividing the blind spot correspond to different hazard levels, the hazard level faced by the traffic participant in different warning regions within the blind spot varies. When issuing warnings, targeted warnings are performed corresponding to the hazard level of the warning region where the traffic participant is located, reflecting the differences in warnings when the traffic participant is in different warning regions within the blind spot. Therefore, through the division of the blind spot and the determination of the warning region where the traffic participant is located, this technical solution can accurately provide warnings of different hazard levels for blind spots to enhance driving safety.

In an embodiment, determining the blind spot of the vehicle during travel includes: determining the vehicle's body parameters or travel speed; and determining the blind spot of the vehicle during travel based on the vehicle's body parameters or travel speed.

In an embodiment, dividing the blind spot to obtain multiple warning regions includes: determining a division factor of the blind spot, and the division factor includes: the type of the traffic participant or the travel direction of the vehicle; and dividing the blind spot to obtain multiple warning regions according to the division factor.

In an embodiment, different types of traffic participants correspond to respective hazard levels, and different travel directions correspond to respective hazard levels; dividing the blind spot to obtain multiple warning regions according to the division factor includes: determining a hazard level corresponding to the type of the traffic participant in the blind spot, or determining a hazard level corresponding to the travel direction of the vehicle; dividing the blind spot to obtain multiple warning regions corresponding to the type of the traffic participant or the travel direction of the vehicle according to the hazard level corresponding to the type of the traffic participant or the hazard level corresponding to the travel direction.

In an embodiment, the division factor includes the type of the traffic participant and the travel direction of the vehicle. For the same type of traffic participant, different travel directions each correspond to multiple warning regions. When the travel direction of the vehicle is the target travel direction, the first warning region corresponding to the target travel direction has the maximum width among the first warning regions corresponding to different travel directions. The target travel direction is the travel direction with the highest hazard level among the different travel directions. For the same travel direction, different types of traffic participants each correspond to multiple warning regions. When the type of the traffic participant is the target type, the first warning region corresponding to the target type of the traffic participant has the maximum width among the first warning regions corresponding to different types of traffic participants. The target type of the traffic participant is the type of the traffic participant with the highest hazard level among the different types of traffic participants. The first warning region is the region closest to the vehicle among the multiple warning regions.

In an embodiment, for the same type of traffic participant, the higher the hazard level corresponding to the travel direction of the vehicle, the greater the width of the first warning region. For the same travel direction, the higher the hazard level corresponding to the type of the traffic participant, the greater the width of the first warning region.

In an embodiment, the traffic participants in the blind spot include: a first type of traffic participant and a second type of traffic participant, where the hazard level corresponding to the first type of traffic participant is higher than the hazard level corresponding to the second type of traffic participant. The multiple warning regions include: multiple warning regions corresponding to the first type of traffic participant and multiple warning regions corresponding to the second type of traffic participant. Determining a warning region from the multiple warning regions in which the traffic participant is located includes: determining a warning region in which the first type of traffic participant is located among the multiple warning regions corresponding to the first type of traffic participant; and determining a warning region in which the second type of traffic participant is located among the multiple warning regions corresponding to the second type of traffic participant.

In an embodiment, determining the warning region in which the first type of traffic participant is located among the multiple warning regions corresponding to the first type of traffic participant includes: determining a first feature point for representing the first type of traffic participant; and determining a warning region in which the first type of traffic participant is located based on whether the first feature point falls within the multiple warning regions corresponding to the first type of traffic participant. Determining the warning region in which the second type of traffic participant is located among the multiple warning regions corresponding to the second type of traffic participant includes: determining a second feature point for representing the second type of traffic participant; and determining a warning region in which the second type of traffic participant is located based on whether the second feature point falls within the multiple warning regions corresponding to the second type of traffic participant.

In an embodiment, performing a warning corresponding to the hazard level of the warning region where the traffic participant is located based on the hazard level of the warning region includes: when the traffic participant is distributed in one warning region, performing a warning corresponding to the hazard level of that warning region; and when the traffic participant is distributed in multiple warning regions, determining the highest hazard level among the hazard levels of the multiple warning regions and performing a warning corresponding to the highest hazard level.

In an embodiment, performing a warning corresponding to the hazard level of the warning region where the traffic participant is located based on the hazard level of the warning region includes: when it is identified that the traffic participant in the blind spot includes a first type of traffic participant and a second type of traffic participant, performing a warning corresponding to the hazard level of the warning region where the first type of traffic participant is located, where the hazard level corresponding to the first type of traffic participant is higher than the hazard level corresponding to the second type of traffic participant.

In an embodiment, identifying the traffic participant in the blind spot includes: collecting data on the blind spot using a supplementary LiDAR to obtain point cloud data, where the supplementary LiDAR is positioned on the right side of the vehicle's body; and identifying the traffic participant in the blind spot based on the point cloud data.

In an embodiment, identifying the traffic participant in the blind spot based on the point cloud data includes: inputting the point cloud data into a pre-trained recognition model to output the presence of traffic participants in the blind spot, where the recognition model is trained based on historical data collected by the supplementary LiDAR, including point cloud data of different types of traffic participants.

In an embodiment, after identifying the traffic participant in the blind spot, the method further includes: determining if there is a target traffic participant among the traffic participants in the blind spot, where there is a barrier between the target traffic participant and the vehicle; and performing a warning corresponding to the hazard level of the warning region where the target traffic participant is located based on the hazard level of the warning region, including: if the target traffic participant exists, performing a warning corresponding to the hazard level of the warning region where the remaining traffic participants are located. The remaining traffic participants include traffic participants in the blind spot other than the target traffic participant.

In an embodiment, performing a warning corresponding to the hazard level of the warning region where the traffic participant is located based on the hazard level of the warning region includes: generating a warning image based on the hazard level of the warning region where the traffic participant is located; and displaying the warning image on the vehicle's display screen.

In an embodiment, performing a warning corresponding to the hazard level of the warning region where the traffic participant is located based on the hazard level of the warning region includes: determining the moving speed and moving direction of the traffic participant; when the hazard level of the warning region where the traffic participant is located is at a preset level, increasing the hazard level of the warning region where the traffic participant is located if the moving speed of the traffic participant exceeds a preset speed threshold and the moving direction of the traffic participant is towards the vehicle; and performing a warning corresponding to the increased hazard level, where the hazard level of the warning region is at the preset level and the warning region is farther from the vehicle than a preset distance.

In an embodiment, a device for blind spot warning is provided, comprising: a first determining module configured to determine the blind spot of a vehicle during travel; an identifying module configured to identify a traffic participant in the blind spot; a dividing module configured to divide the blind spot to obtain multiple warning regions, where the multiple warning regions have different hazard levels; a second determining module configured to determine a warning region from the multiple warning regions in which the traffic participant is located; and a warning module configured to perform a warning corresponding to the hazard level of the warning region based on the hazard level of the warning region in which the traffic participant is located.

In an embodiment, an electronic device is provided, comprising a memory and a processor. The memory is used to store executable program code, and the processor is configured to call and run the executable program code from the memory, enabling the electronic device to execute the method embodiments.

In an embodiment, a computer program product is provided, including computer program code that, when executed on a computer, causes the computer to perform the method embodiments.

In an embodiment, a non-transitory computer-readable storage medium is provided, storing a computer program that, when executed, enables a computer to perform the method embodiments.

BRIEF DESCRIPTION OF DRAWINGS

To provide a clearer explanation of the technical solutions in the embodiments described in this application, a brief introduction to the drawings required in the embodiments or related art descriptions will be presented below.

FIG. 7 illustrates a structural schematic diagram of an electronic device, according to some embodiments.

DETAILED DESCRIPTION

The following detailed description of the technical solution in this application will be provided in conjunction with the accompanying drawings. In the description of the embodiments in this application, unless otherwise stated, "/" indicates an alternative meaning, for example, A/B can represent A or B: in the text, "or" is merely a way to describe the relationship between associated objects, indicating that there can be three types of relationships, such as A or B, which can represent: A alone, both A and B together, and B alone. In addition, in the description of the embodiments in this application, "multiple" refers to two or more than two.

The terms "first" and "second" used herein are for descriptive purposes only and should not be construed as indicating importance or implying a specific quantity of the indicated technical features. Therefore, features labeled as "first" or "second" may explicitly or implicitly include one or more of those features.

The embodiment of the present application provides a blind spot warning method, where the actor of this method can be an electronic device with a blind spot warning function. The electronic device can be a vehicle, such as a controller or processor in the vehicle, a mobile terminal like a phone or tablet communicating with the vehicle, or a server communicating with the vehicle. The application scenario of this embodiment can be: warning of potential dangers in the blind spot of a vehicle during its operation.

Figure 1:
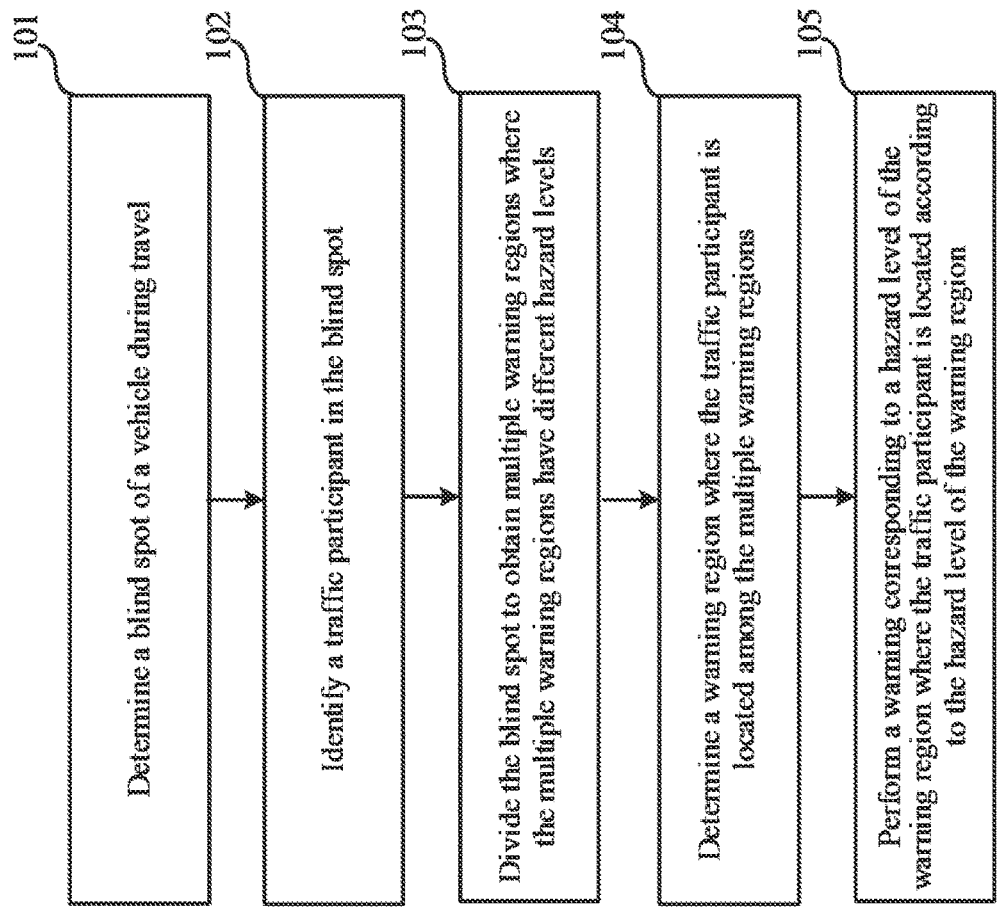
FIG. 1 illustrates a schematic flowchart of a blind spot warning method, according to some embodiments.

FIG. 1 illustrates a schematic flowchart of a blind spot warning method, according to some embodiments.

The blind spot warning method according to some embodiments, as shown in FIG. 1, includes:

Step 101: Determine a blind spot of a vehicle during travel.

Step 102: Identify a traffic participant in the blind spot.

Step 103: Divide the blind spot to obtain multiple warning regions, where the multiple warning regions have different hazard levels.

Step 104: Determine a warning region where the traffic participant is located among the multiple warning regions.

Step 105: Perform a warning corresponding to the hazard level of the warning region where the traffic participant is located according to the hazard level of the warning region.

In the embodiment shown in FIG. 1, since multiple warning regions obtained by dividing the blind spot correspond to different hazard levels, when a traffic participant is in different warning regions within the blind spot, the current hazard level faced by the traffic participant also varies. Moreover, during the warning process, targeted warnings are performed corresponding to the hazard level of the warning region where the traffic participant is located, meaning that the warnings differ when the traffic participant is in different warning regions within the blind spot. Therefore, through the division of the blind spot and the determination of the warning region where the traffic participant is located, the method can accurately provide warnings of different hazard levels for the blind spot to enhance driving safety.

In step 101, the electronic device may determine the blind spot of the vehicle during the vehicle's travel. The blind spot of the vehicle can be understood as the blind spot in the field of view of the driver driving the vehicle.

In an embodiment, the blind spot of the vehicle can be located on the right side of the vehicle body. The preset area on the right side of the vehicle body can be considered as the blind spot of the vehicle. The size of the preset area can be set according to actual needs and is not limited herein.

In an embodiment, the process of determining the blind spot of the vehicle can be combined with one or more of the following factors: the type of the vehicle, the trajectory of the vehicle, the orientation of the driver's seat of the vehicle, etc. The type of the vehicle can be categorized as small, medium, and large based on the size of the vehicle. The trajectory of the vehicle may include: forward, reverse, turning, etc. The orientation of the driver's seat of the vehicle may be on the left side of the vehicle or on the right side of the vehicle. The distinction between the left and right sides of the vehicle can be based on the centerline of the vehicle when the vehicle is moving forward.

In an embodiment, the type of the vehicle is used to determine the blind spot of the vehicle. In an embodiment, when the vehicle is a large vehicle, the blind spot of the vehicle may include areas distributed on the right side, rear side, and left side of the vehicle. When the vehicle is a medium-sized vehicle, the blind spot of the vehicle may include areas distributed on the right side and rear side of the vehicle. When the vehicle is a small vehicle, the blind spot of the vehicle may include areas distributed on the right side of the vehicle. The larger the vehicle size, the wider the distribution range of the corresponding blind spot.

In an embodiment, the blind spot of the vehicle can be determined based on the vehicle's trajectory. In an embodiment, when the vehicle's trajectory is in reverse, the blind spot of the vehicle may include areas distributed on the right side and rear side of the vehicle; when the vehicle's trajectory is forward, the blind spot of the vehicle may include areas distributed on the left side and right side of the vehicle.

In an embodiment, the blind spot of the vehicle can be determined based on the orientation of the driver's seat in the vehicle. In an embodiment, when the orientation of the driver's seat in the vehicle is on the left side, the blind spot of the vehicle may include the area on the right side of the vehicle body. When the orientation of the driver's seat in the vehicle is on the right side, the blind spot of the vehicle may include the area on the left side of the vehicle body.

In an embodiment, the implementation of the above step 101 to determine the blind spot of the vehicle during travel may include: determining the vehicle's body parameters or travel speed, and based on these parameters, determining the blind spot of the vehicle during travel. Here, the body parameters refer to the size parameters of the vehicle, such as: the length, height, and width of the vehicle body. The vehicle's travel speed is the current speed at which the vehicle is moving.

In an embodiment, the implementation of determining the blind spot of a vehicle during travel may include: determining the vehicle's body parameters and determining the blind spot of the vehicle during travel based on the vehicle's body parameters.

In an embodiment, the electronic device may pre-store a first correspondence between vehicle body parameters and blind spot dimensions, where different vehicle body parameters each correspond to their respective blind spot dimensions. The blind spot dimensions corresponding to different vehicle body parameters can be the same or different. Here, the blind spot dimensions can be understood as the length and width of the blind spot. In an embodiment, in the first correspondence, the larger the vehicle body parameter, the larger the corresponding blind spot dimensions. In this embodiment, based on the aforementioned first correspondence and the vehicle's body parameters, the blind spot dimensions corresponding to the vehicle's body parameters can be determined. Then, based on the blind spot dimensions corresponding to the vehicle's body parameters, the blind spot on the right side of the vehicle is determined. The determined blind spot dimensions of this blind spot are the blind spot dimensions corresponding to the vehicle's body parameters in the first correspondence mentioned above.

In an embodiment, the implementation of determining the blind spot of a vehicle during travel can include: determining the travel speed of the vehicle, and based on the travel speed, determining the blind spot of the vehicle during travel.

In an embodiment, a second correspondence between travel speed and blind spot size can be pre-stored in the electronic device, where different travel speeds correspond to their respective blind spot sizes. The blind spot sizes corresponding to different travel speeds can be the same or different. In an embodiment, in the second correspondence, the larger the travel speed, the larger the corresponding blind spot size. In this embodiment, based on the aforementioned second correspondence and the vehicle's travel speed, the blind spot size corresponding to the vehicle's travel speed is determined. Then, based on the blind spot size corresponding to the vehicle's travel speed, the blind spot on the right side of the vehicle's body is determined. The determined blind spot size of the blind spot is the blind spot size corresponding to the vehicle's travel speed in the second correspondence. In this embodiment, with the change in the vehicle's travel speed, the determined blind spot of the vehicle can also be dynamically changing. Moreover, the faster the travel speed, the larger the determined blind spot, allowing for the recognition of traffic participants in a larger area range, which is beneficial for further enhancing driving safety.

In an embodiment, the implementation of determining the blind spot of a vehicle during travel may include: determining the vehicle's body parameters and travel speed, and based on these parameters, determining the blind spot of the vehicle during travel. The blind spot of the vehicle during travel can be determined by combining the vehicle's body parameters and travel speed simultaneously.

In an embodiment, the electronic device may first determine the initial blind spot of the vehicle based on the vehicle's body parameters. Then, the initial blind spot is adjusted according to the vehicle's travel speed to obtain the final blind spot of the vehicle during travel. The electronic device can determine the size of the initial blind spot based on the aforementioned first correspondence and the vehicle's body parameters, and use the corresponding size to define the initial blind spot, thus determining the initial blind spot of the vehicle. During the vehicle's travel, the electronic device can adjust the initial blind spot based on the comparison between the current travel speed of the vehicle and a preset standard speed. In an embodiment, when the current speed exceeds the preset standard speed, the size of the initial blind spot can be increased. When the current speed is below the preset standard speed, the size of the initial blind spot can be decreased. The preset standard speed can be set according to actual needs and is not limited herein.

In an embodiment, the vehicle body parameter is equivalent to the static characteristic of the vehicle, and the travel speed is equivalent to the dynamic characteristic of the vehicle. Therefore, by combining the vehicle body parameter or travel speed, the determined blind spot can better match the static or dynamic characteristics of the vehicle, which helps to improve the accuracy of determining the blind spot and to further enhance the accuracy of warning for the blind spot.

In step 102, the electronic device can identify traffic participants in the blind spot. The traffic participants may include any one or a combination of the following: pedestrians, bicycles, electric bicycles, motorcycles, tricycles, cars, trucks, buses, and large vehicles. In an embodiment, the types of traffic participants may include: a first type of traffic participant and a second type of traffic participant, where the hazard level corresponding to the first type of traffic participant is higher than the hazard level corresponding to the second type of traffic participant. In an embodiment, the first type of traffic participant can be submissive traffic participants, and the second type of traffic participant can be dominant traffic participants. Submissive traffic participants may include cars, trucks, buses, and large vehicles. Dominant traffic participants may include pedestrians, bicycles, electric bicycles, motorcycles, tricycles, etc. In this step, the electronic device can identify which traffic participants have appeared in the blind spot.

In an embodiment, the implementation of step 102 may include: collecting data of the blind spot through a blind spot LiDAR to obtain point cloud data. Based on the point cloud data, traffic participants in the blind spot are identified. The blind spot LiDAR is positioned on the right side of the vehicle body to ensure that its detection range covers the blind spot of the vehicle.

In an embodiment, due to the fact that the blind spot LiDAR is not affected by lighting, humidity, or dust, data collection of the blind spot is carried out using the blind spot LiDAR, making the collected data more accurate. This allows for a more precise identification of traffic participants in the blind spot based on the collected point cloud data, thereby improving the accuracy of subsequent warnings. In an embodiment, the blind spot LiDAR can be a 3D blind spot LiDAR, and data collected by a 3D blind spot LiDAR is more accurate, which is beneficial for enhancing warning precision.

In an embodiment, the installation method for the blind spot LiDAR can be determined based on the performance parameters of the blind spot LiDAR and the vehicle body bracket situation. In an embodiment, when the performance parameters of the blind spot LiDAR include: the field of view angle FOV is vertical 0°-90°, horizontal 0°-360°, with 32 beams, and horizontal angular resolution of 0.2°/0.4°, then the installation method for the blind spot LiDAR is reversely mounted on the right side of the vehicle body.

In an embodiment, the electronic device may acquire point cloud data collected by a blind spot LiDAR, and based on the point cloud data, remove ground point cloud data while retaining background point cloud data. Clustering segmentation is performed on the background point cloud data to obtain bounding boxes of several clustered point clouds. In an embodiment, by using the Euclidean clustering method, setting a minimum number of clustered point clouds and a minimum clustering distance can determine the minimum enclosing polygon of the clustered point clouds, namely, the bounding box of the clustered point clouds. Feature data of each bounding box is obtained, based on this feature data, the presence of traffic participants within the bounding box is identified. The feature data may include: the size or movement speed of the bounding box. The movement speed of the bounding box can be determined based on the movement speed of the point clouds within the bounding box. For example, the average movement speed of the point clouds within the bounding box can be used as the movement speed of the bounding box. Different traffic participants such as pedestrians, bicycles, and trucks usually have different movement speeds and sizes. In an embodiment, the sizes or movement speeds of the bounding boxes are compared with the typical sizes or movement speeds of different traffic participants to identify the traffic participants within the bounding boxes. In an embodiment, when the size of bounding box A is similar to that of a bicycle and the movement speed of bounding box A is close to the typical movement speed of a bicycle, the traffic participant within bounding box A can be determined to be a bicycle.

In an embodiment, the method for identifying traffic participants in the blind spot based on point cloud data as described above may include: inputting the point cloud data into a pre-trained recognition model to output the traffic participants present in the blind spot. The recognition model is trained based on historical data collected by the blind spot LiDAR, which includes point cloud data of different types of traffic participants. These different types of traffic participants may include the aforementioned dominant traffic participants (pedestrians, bicycles, electric bicycles, motorcycles, tricycles) and submissive traffic participants (small cars, large trucks, buses, oversized vehicles).

In an embodiment, after obtaining historical data collected by the blind spot LiDAR, the historical data can be cleaned, and based on the cleaned historical data, training and testing datasets can be created. By iteratively training with the training dataset, a recognition model is obtained, and this model is tested with the testing dataset. When the recognition model passes the testing with the testing dataset, the model can be considered as a well-trained recognition model. The well-trained recognition model is used to recognize traffic participants based on the input point cloud data. In an embodiment, after feeding the point cloud data into the pre-trained recognition model, the model can output the traffic participants present in the blind spot. When there are multiple traffic participants in the blind spot, the recognition model can provide a list of recognized traffic participants.

In an embodiment, the implementation of step 102 may include: collecting data on the blind spot through a camera to obtain image data. Based on the image data, traffic participants in the blind spot are identified. The camera can be positioned on the right side of the vehicle body, and its shooting range can cover the blind spot of the vehicle.

In step 103, the electronic device may divide the blind spot to obtain multiple warning regions, where the multiple warning regions have different hazard levels.

In an embodiment, the electronic device may divide the blind spot into three warning regions. The three warning regions can be, in order of proximity to the vehicle, a first warning region, a second warning region, and a third warning region. The first warning region is closest to the vehicle, and the third warning region is farthest from the vehicle. Among the three warning regions, the first warning region has the highest hazard level, and the third warning region has the lowest hazard level. The widths of the three warning regions can be the same or different. The closer the warning region is to the vehicle, the higher the corresponding hazard level. Therefore, the width of the warning region closer to the vehicle can be larger.

In an embodiment, the implementation of step 103 may include: determining the division factor of the blind spot, dividing the blind spot according to the division factor to obtain multiple warning regions. The division factor includes: the type of traffic participants or the travel direction of the vehicle. The types of traffic participants include a first type of traffic participant and a second type of traffic participant, where the first type of traffic participant may represent submissive traffic participants, and the second type of traffic participant may represent dominant traffic participants. The travel direction of the vehicle could be straight, right turn, or left turn.

In an embodiment, when the determined division factor includes the type of traffic participants, the blind spot can be divided into multiple warning regions based on the types of traffic participants. In an embodiment, different types of traffic participants can correspond to different combinations of warning region widths. This combination of warning region widths includes multiple width values, and based on these width values in the combination, the blind spot is divided into multiple warning regions. The width values of the multiple warning regions obtained from the division are the same as the multiple width values in the combination of warning region widths. In this embodiment, a third correspondence between the type of traffic participants and the combination of warning region widths can be pre-set. Based on this third correspondence and the type of traffic participants in the blind spot, the combination of warning region widths corresponding to the type of traffic participants in the blind spot can be determined. The blind spot is divided into multiple warning regions based on the multiple width values in this combination of warning region widths.

In an embodiment, when the determined division factor includes the travel direction of the vehicle, the blind spot can be divided into multiple warning regions based on the travel direction of the vehicle. In an embodiment, different travel directions can correspond to different combinations of warning region widths. In this embodiment, a fourth correspondence between the travel direction and the combination of the warning region widths can be pre-set. Based on this fourth correspondence and the current travel direction of the vehicle, the combination of warning region widths corresponding to the current travel direction of the vehicle can be determined, and multiple width values in this combination of warning region widths can be used to divide the blind spot into multiple warning regions.

In an embodiment, when the determined division factor includes the type of traffic participants and the travel direction of the vehicle, the blind spot can be divided into multiple warning regions based on the type of traffic participants and the travel direction of the vehicle. In an embodiment, a combination of a type of traffic participant and a travel direction can correspond to a combination of warning region widths. A fifth correspondence between the combinations of types of traffic participants and travel directions and the combination of warning region widths can be pre-set. Based on this fifth correspondence, the current travel direction of the vehicle, and the type of traffic participant in the blind spot, the combination of the current travel direction of the vehicle and the type of traffic participant in the blind spot can be determined to correspond to a combination of warning region widths. Based on multiple width values in this combination of warning region widths, the blind spot can be divided into multiple warning regions. Table 1 below illustrates the explanation of the fifth correspondence:

TABLE 1

| | Dominant traffic participants | Submissive traffic participants |
|---|---|---|
| Straight | Combination of warning region widths 1 | Combination of warning region widths 2 |
| Left turn | Combination of warning region widths 3 | Combination of warning region widths 4 |
| Right turn | Combination of warning region widths 5 | Combination of warning region widths 6 |

Referring to Table 1, when the current travel direction of the vehicle is straight and the type of traffic participant in the blind spot is a dominant traffic participant, the combination of warning region widths corresponding to the combination of straight travel and dominant traffic participant can be determined as combination of warning region widths 1. Based on multiple width values in combination of warning region widths 1, the blind spot can be divided into multiple warning regions. In an embodiment, the blind spot is divided into 3 warning regions, the combination for warning region widths can include 3 width values, which can be the width values for the first warning region, the second warning region, and the third warning region mentioned above.

In an embodiment, different types of traffic participants correspond to respective hazard levels, and different travel directions correspond to respective hazard levels. In an embodiment, the hazard level corresponding to a dominant traffic participant is greater than the hazard level corresponding to a submissive traffic participant. The hazard level corresponding to a right turn is greater than the hazard level corresponding to going straight, and the hazard level corresponding to going straight is greater than the hazard level corresponding to a left turn. In this embodiment, based on the division factor mentioned above, the blind spot is divided to obtain multiple warning regions, including: determining the hazard level corresponding to the type of traffic participant in the blind spot, or determining the hazard level corresponding to the travel direction of the vehicle; dividing the blind spot to obtain multiple warning regions corresponding to the type of traffic participant or the travel direction of the vehicle according to the hazard level corresponding to the type of traffic participant or the hazard level corresponding to the travel direction.

In an embodiment, the blind spot is divided into multiple warning regions based on division factors, including: determining the hazard level corresponding to the type of traffic participant in the blind spot, dividing the blind spot into multiple warning regions corresponding to the type of traffic participant based on the hazard level corresponding to the type of traffic participant in the blind spot. In an embodiment, when the hazard level corresponding to the type of traffic participant is higher, the width of the first warning region obtained by dividing the blind spot is larger, and this first warning region is the one closest to the vehicle among the multiple warning regions obtained by division. When there are both dominant and submissive traffic participants in the blind spot, multiple warning regions corresponding to the dominant traffic participants and multiple warning regions corresponding to the submissive dominant traffic participants can be obtained by dividing the blind spot.

In an embodiment, the blind spot is divided into multiple warning regions based on division factors, including: determining the hazard level corresponding to the vehicle's travel direction; dividing the blind spot into multiple warning regions corresponding to the vehicle's travel direction based on the hazard level corresponding to the travel direction. For example, the higher the hazard level corresponding to the travel direction, the wider the width value of the first warning region obtained by dividing the blind spot.

In an embodiment, the division factor includes the type of the traffic participant and the travel direction of the vehicle. According to the division factor, the blind spot is divided to obtain multiple warning regions, including: determining the hazard level corresponding to the type of traffic participant in the blind spot and the hazard level corresponding to the travel direction of the vehicle; dividing the blind spot to obtain multiple warning regions corresponding to the type of traffic participant and the travel direction of the vehicle according to the hazard level corresponding to the type of traffic participant and the hazard level corresponding to the travel direction.

For the same type of traffic participant, there are multiple respective warning regions for different travel directions. When the vehicle's travel direction is the target travel direction, the first warning region corresponding to the target travel direction has the maximum width among the first warning regions corresponding to different travel directions, and the target travel direction is the direction with the highest hazard level among different travel directions. The first warning region is the region closest to the vehicle among the multiple warning regions. For example, different travel directions include: straight, left turn, and right turn, and the target travel direction can be the right turn among these three directions.

Figure 2:
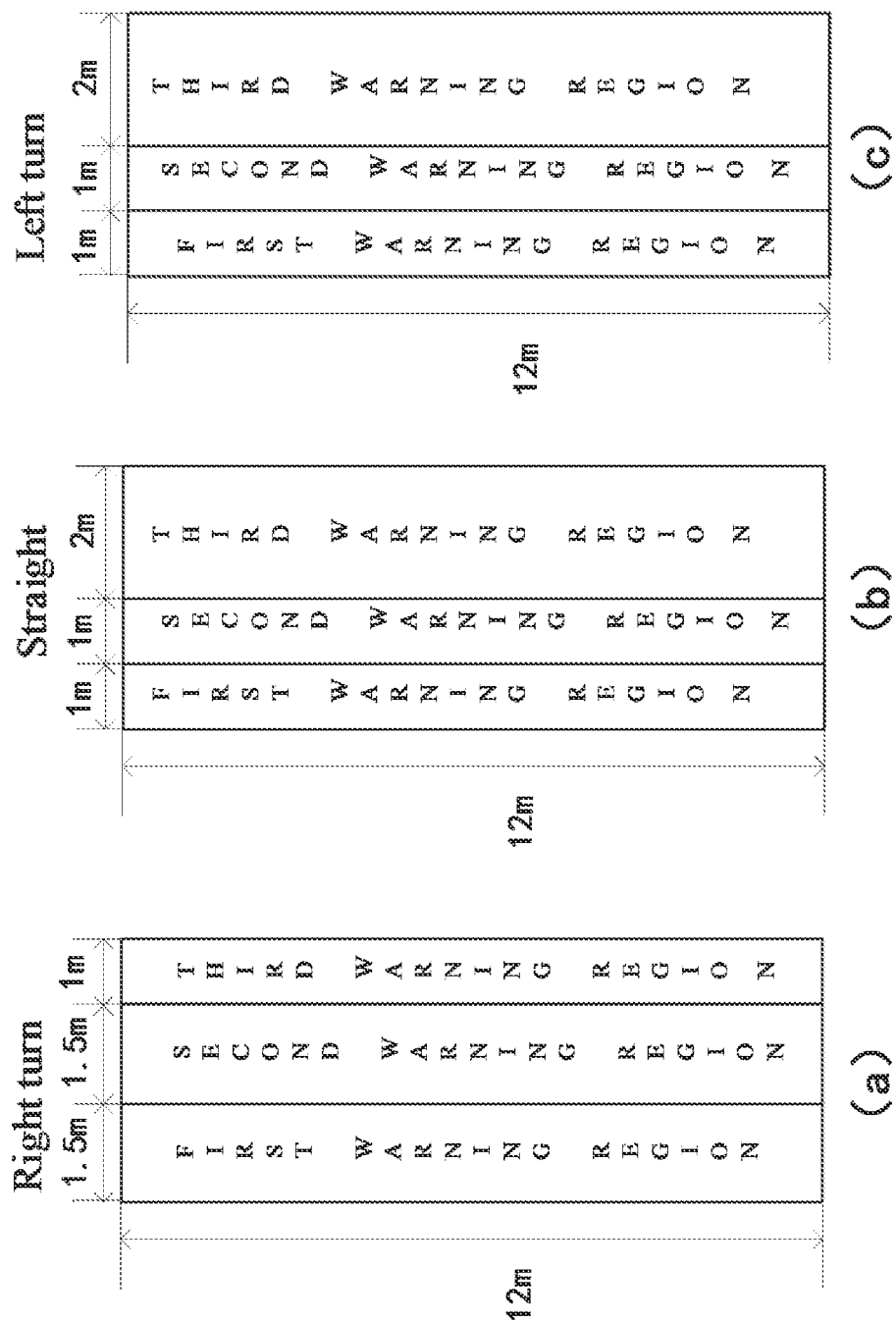
FIG. 2 illustrates a schematic diagram of multiple warning regions corresponding to different travel directions for dominant traffic participants, according to some embodiments.
Figure 3:
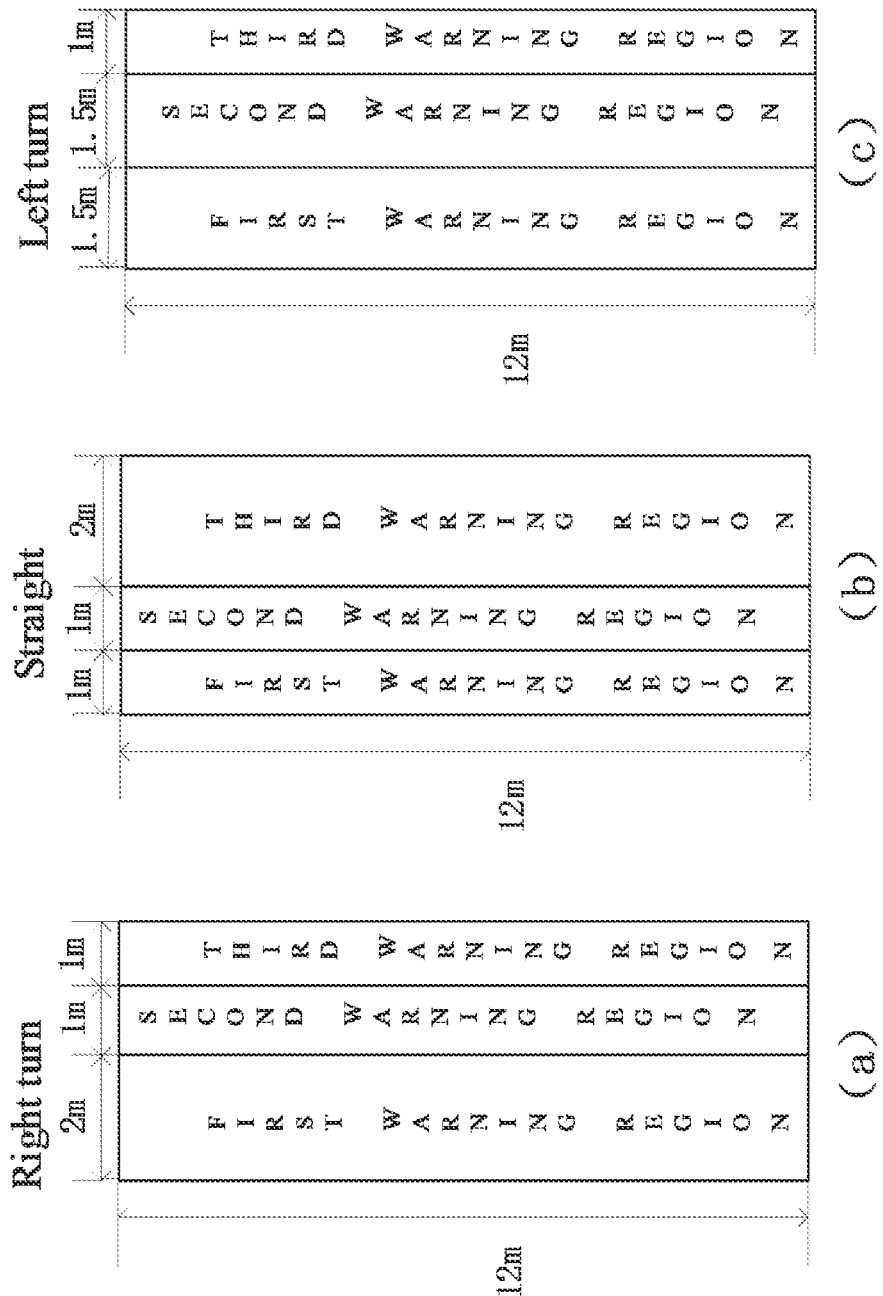
FIG. 3 illustrates a schematic diagram of multiple warning regions corresponding to different travel directions for submissive traffic participants, according to some embodiments.

FIG. 2 illustrates a schematic diagram of multiple warning regions corresponding to different travel directions for dominant traffic participants, according to some embodiments. FIG. 3 illustrates a schematic diagram of multiple warning regions corresponding to different travel directions for submissive traffic participants, according to some embodiments. The dimensions of the blind spot in FIG. 2 and FIG. 3 are taken as an example of 4 m (width)*12 m (length).

From FIG. 2, for dominant traffic participants, the multiple warning regions corresponding to right turns are the 3 warning regions in (a) of FIG. 2, the multiple warning regions corresponding to going straight are the 3 warning regions in (b) of FIG. 2, and the multiple warning regions corresponding to left turns are the 3 warning regions in (c) of FIG. 2. The first warning region corresponding to a right turn has the maximum width among the first warning regions corresponding to different travel directions, namely, the first warning region in (a) of FIG. 2 has the maximum width among the 3 first warning regions in (a), (b), and (c) of FIG. 2. Considering that for dominant traffic participants, the difference in hazard level between left turns and going straight is not significant, the multiple warning regions corresponding to left turns and going straight can be the same, i.e., (b) and (c) in FIG. 2 are the same. In actual applications, the multiple warning regions corresponding to left turns and going straight can be different and are not limited herein.

From FIG. 3, for submissive traffic participants, the multiple warning regions corresponding to a right turn are the 3 warning regions in (a) of FIG. 3, the multiple warning regions corresponding to a straight movement are the 3 warning regions in (b) of FIG. 3, and the multiple warning regions corresponding to a left turn are the 3 warning regions in (c) of FIG. 3. The first warning region corresponding to a right turn has the maximum width among the first warning regions corresponding to different travel directions, namely, the first warning region in (a) of FIG. 3 has the maximum width among the 3 first warning regions in (a), (b), and (c) of FIG. 3.

In an embodiment, considering that the blind spot is on the right side of the vehicle, making right turns is usually most dangerous. When the vehicle makes a right turn, the width of the first warning region close to the right side of the vehicle is set larger. The width of the second warning region and the width of the third warning region can be set based on experience and is not limited here. Turning left or going straight is relatively safer compared to making a right turn, so the widths of the warning regions corresponding to left turns and going straight can be slightly smaller than those corresponding to right turns, and the widths can be set based on experience and are not limited here.

In an embodiment, for the same travel direction, each of the different types of traffic participants respectively corresponds to multiple warning regions. When the type of the traffic participant is the target type, the first warning region corresponding to the target type of traffic participant has the maximum width among the first warning regions corresponding to different types of traffic participants. The target type of traffic participant is the one with the highest hazard level among different types of traffic participants. In an embodiment, different types of traffic participants include: dominant traffic participants and submissive traffic participants, where the target type can be the aforementioned submissive traffic participants.

Referring to FIGS. 2 and 3, for the same travel direction, such as a right turn, multiple warning regions corresponding to the dominant traffic participants are represented by (a) in FIG. 2, and multiple warning regions corresponding to the submissive traffic participants are represented by (a) in FIG. 3. The first warning region corresponding to the submissive traffic participants has the maximum width among the first warning regions corresponding to different types of traffic participants, i.e., among the two first warning regions in (a) of FIG. 2 and (a) of FIG. 3, the first warning region in (a) of FIG. 3 has the maximum width.

In an embodiment, considering that submissive traffic participants are more dangerous than dominant traffic participants, the width of the first warning region corresponding to submissive traffic participants is relatively larger, which, to some extent, helps to improve driving safety.

In an embodiment, for the same type of traffic participant, the higher the hazard level corresponding to the travel direction of the vehicle, the wider the first warning region; for the same travel direction, the higher the hazard level corresponding to the type of traffic participant, the wider the first warning region. In an embodiment, for a dominant traffic participant, the width of the first warning region corresponding to a right turn is 2 m, corresponding to a straight movement is 1.5 m, and corresponding to a left turn is 1 m. For a left turn, the width of the first warning region corresponding to a dominant traffic participant is 1 m, and that corresponding to a submissive traffic participant is 1.5 m.

In step 104, the electronic device may determine the warning region in which the traffic participant is located among the multiple warning regions obtained by division. For example, the position where the traffic participant is located can be determined first, and then which warning region the traffic participant's position belongs to is determined.

In an embodiment, the traffic participants in the blind spot include: a first type of traffic participant and a second type of traffic participant, where the hazard level corresponding to the first type of traffic participant is higher than the hazard level corresponding to the second type of traffic participant. The multiple warning regions obtained by dividing the blind spot include: multiple warning regions corresponding to the first type of traffic participant and multiple warning regions corresponding to the second type of traffic participant. In an embodiment, when the current vehicle is turning right, the multiple warning regions corresponding to the first type of traffic participant can be as shown in (a) in FIG. 3, and the multiple warning regions corresponding to the second type of traffic participant can be as shown in (a) in FIG. 2. In an embodiment, the implementation of step 104 can be as follows.

In multiple warning regions corresponding to the first type of traffic participant, determine the warning region where the first type of traffic participant is located. In multiple warning regions corresponding to the second type of traffic participant, determine the warning region where the second type of traffic participant is located. In an embodiment, in the three warning regions shown in (a) of FIG. 3, determine the warning region where the first type of traffic participant is located. In the three warning regions shown in (a) of FIG. 2, determine the warning region where the second type of traffic participant is located.

In an embodiment, determining the warning region in which the first type of traffic participant is located among the multiple warning regions corresponding to the first type of traffic participant includes: determining a first feature point for representing the first type of traffic participant; and determining the warning region in which the first type of traffic participant is located based on whether the first feature point falls within the multiple warning regions corresponding to the first type of traffic participant.

In an embodiment, the first type of feature point can be the center point of the first type of traffic participant, and the location of the first type of traffic participant's center point in one of the warning regions shown in (a) of FIG. 3 can be used to determine the warning region where the first type of traffic participant is located. For example, if the center point of the first type of traffic participant falls within the first warning region shown in (a) of FIG. 3, the first type of traffic participant is determined in the first warning region.

In an embodiment, the first type of feature point can be the vertex of the bounding box of the first type of traffic participant, so that by determining whether the vertex of the bounding box falls within one of the warning regions shown in (a) of FIG. 3, the warning region where the first type of traffic participant is located can be determined.

In an embodiment, the first type of feature point may include the aforementioned center point and the vertices of the bounding box, so that by determining whether both the center point and the vertices of the bounding box fall within a certain warning region shown in (a) of FIG. 3, the warning region where the first type of traffic participant is located can be determined.

In an embodiment, when the current travel direction of the vehicle is turning right, the multiple warning regions corresponding to the first type of traffic participant, namely submissive traffic participants, can be as shown in (a) of FIG. 3. The recognition model mentioned above can output a list of recognized traffic participants in the blind spot (referred to as an object list, where each traffic participant is understood as an object). For the first warning region in (a) of FIG. 3, the identified object list can be traversed to filter out objects belonging to the submissive traffic participant type, determining if the object falls within the first warning region. If the object falls within the first warning region, the object is kept in the first object list corresponding to the first warning region; if the object is not falls within the first warning region, the object is skipped until the entire object list is traversed to obtain the first object list corresponding to the first warning region. The objects in the first object list are those located in the first warning region in (a) of FIG. 3. The same traversal operation is performed for the second and third warning regions in (a) of FIG. 3 to obtain the second object list corresponding to the second warning region and the third object list corresponding to the third warning region. The objects in the second object list are those located in the second warning region in (a) of FIG. 3, and the objects in the third object list are those located in the third warning region in (a) of FIG. 3.

In an embodiment, determining the warning region in which the second type of traffic participant is located among the multiple warning regions corresponding to the second type of traffic participant includes: determining a second feature point for representing the second type of traffic participant, and determining the warning region in which the second type of traffic participant is located based on whether the second feature point falls within the multiple warning regions corresponding to the second type of traffic participant.

In an embodiment, the second type of feature point can be the center point of the second type of traffic participant, and the location of the second type of traffic participant in the warning region can be determined by checking whether the center point of the second type of traffic participant falls within one of the warning regions shown in (a) of FIG. 2. In an embodiment, if the center point of the second type of traffic participant falls within the second warning region shown in (a) of FIG. 2, the second type of traffic participant is determined in the second warning region.

In an embodiment, the second feature point can be the vertex of the bounding box of the second type of traffic participant, so that the warning region where the second type of traffic participant is located can be determined by determining whether the vertex of the bounding box falls within one of the warning regions shown in (a) of FIG. 2.

In an embodiment, the second type of feature point may include the center of the second type of traffic participant and the vertices of the bounding box of the second type of traffic participant, so that the warning region where the second type of traffic participant is located can be determined by determining whether both the center of the second type of traffic participant and the vertices of the bounding box of the second type of traffic participant fall within a certain warning region as shown in (a) of FIG. 2.

In an embodiment, when the current travel direction of the vehicle is turning right, then the multiple warning regions corresponding to the second type of traffic participant, namely the dominant traffic participant, can be the three warning regions in (a) of FIG. 2. The recognition model mentioned above can output a list of objects identified in the blind spot. For the first warning region in (a) of FIG. 2, the identified objects in the blind spot can be traversed, filtering out objects belonging to the dominant traffic participant type from the list, checking if the object falls within the first warning region. If the object falls within the first warning region, the object is added to the first object list corresponding to the first warning region; if the object does not fall within the first warning region, the object is skipped until all objects in the list are checked, resulting in the first object list corresponding to the first warning region. The objects in the first object list are those located in the first warning region in (a) of FIG. 2. The same traversal operation is performed for the second and third warning regions in (a) of FIG. 2 to obtain the second object list corresponding to the second warning region and the third object list corresponding to the third warning region. The objects in the second object list are those located in the second warning region in (a) of FIG. 2, and the objects in the third object list are those located in the third warning region in (a) of FIG. 2.

In step 105, the electronic device can perform a warning corresponding to the hazard level of the warning region in which the traffic participant is located based on the hazard level of the warning region. Different hazard levels can correspond to different warning methods. In an embodiment, sound and light alarms can be triggered based on the hazard level. The higher the hazard level, the greater the intensity of the sound and light alarms.

In an embodiment, the implementation of step 105 may include: when traffic participants are distributed in a warning region, perform a warning corresponding to the hazard level of that warning region. When traffic participants in the blind spot are all located in the same warning region, the hazard level of that warning region can be used as the hazard level for the warning. When traffic participants are distributed in multiple warning regions, determine the highest hazard level among the hazard levels of the multiple warning regions, and perform a warning corresponding to the highest hazard level. In an embodiment, if traffic participants in the blind spot are distributed in the second warning region and the third warning region, since the hazard level of the second warning region is higher than that of the third warning region, the hazard level of the second warning region can be used as the hazard level for the warning, and a warning corresponding to the hazard level of the second warning region is performed.

In an embodiment, referring to (a) in FIG. 3, if neither the first warning region nor the second warning region has any traffic participants, and the traffic participant is only distributed in the third warning region, then the hazard level of the third warning region can be used as the warning hazard level, and a warning corresponding to the hazard level of the third warning region can be issued for submissive traffic participants. In an embodiment, both the first warning region and the second warning region have traffic participants, then the hazard level of the first warning region can be used as the warning hazard level, and a warning corresponding to the hazard level of the first warning region can be issued for submissive traffic participants.

In an embodiment, the traffic participants in the blind spot include: a first type of traffic participant and a second type of traffic participant, and the multiple warning regions obtained include: multiple warning regions corresponding to the first type of traffic participant and multiple warning regions corresponding to the second type of traffic participant; when the traffic participant is distributed in multiple warning regions, determining the highest hazard level among the hazard levels of the multiple warning regions includes: when the first type of traffic participant exists in the target warning region corresponding to the first type of traffic participant, and the second type of traffic participant exists in the target warning region corresponding to the second type of traffic participant, determining the hazard level of the target warning region corresponding to the first type of traffic participant as the highest hazard level, where the target warning region is one of the multiple warning regions. The hazard level of the target warning region corresponding to the first type of traffic participant is higher than the hazard level of the target warning region corresponding to the second type of traffic participant.

In an embodiment, referring to (a) in FIG. 2 and (a) in FIG. 3, the target warning region is the second warning region. The hazard level of the second warning region in (a) of FIG. 3 may be higher than the hazard level of the second warning region in (a) of FIG. 2. When there are the first type of traffic participants in the target warning region corresponding to the first type of traffic participants, namely, the second warning region in (a) of FIG. 3, and there are the second type of traffic participants in the target warning region corresponding to the second type of traffic participants, namely, the second warning region in (a) of FIG. 2, the hazard level of the second warning region in (a) of FIG. 2 is determined to be the highest hazard level. Namely, when there are submissive traffic participants in the second warning region of submissive traffic participants and there are dominant traffic participants in the second warning region of dominant traffic participants, the warning level prioritizes submissive traffic participants, thus providing better protection for submissive traffic participants.

In an embodiment, if there are submissive traffic participants in the second warning region of submissive traffic participants, and there are also dominant traffic participants in the second warning region of dominant traffic participants, warnings can be issued separately for dominant traffic participants and submissive traffic participants.

In an embodiment, when a submissive traffic participant exists in the second warning region corresponding to the first type of traffic participant, and a dominant traffic participant exists in the first warning region corresponding to the second type of traffic participant, the final hazard level can be determined based on factors such as the moving speed, distance from the vehicle, and direction of movement of the submissive and dominant traffic participants. For instance, corresponding weights can be set for factors like moving speed, distance from the vehicle, and direction of movement to calculate the hazard levels of the second warning region and the first warning region. The higher hazard level is selected from the calculated two hazard levels, and a warning corresponding to this higher hazard level is issued.

In an embodiment, in step 105, a warning corresponding to the hazard level of the warning region in which the traffic participant is located is performed according to the hazard level of the warning region where the traffic participant is located. When it is identified that the traffic participant in the blind spot includes a first type of traffic participant and a second type of traffic participant, a warning corresponding to the hazard level of the warning region in which the first type of traffic participant is located is performed based on the hazard level of the warning region, where the hazard level corresponding to the first type of traffic participant is higher than the hazard level corresponding to the second type of traffic participant.

In an embodiment, it can be first determined whether the traffic participants in the blind spot simultaneously include a first type of traffic participant and a second type of traffic participant. If both the first type of traffic participant and the second type of traffic participant are present, priority is given to performing a warning corresponding to the hazard level of the warning region in which the first type of traffic participant is located, in order to better protect submissive traffic participants, and this approach is simple and convenient to implement.

In an embodiment, both a first type of traffic participant and a second type of traffic participant are present in the blind spot. If it is determined that the second type of traffic participant is located in its corresponding first warning region, that the movement direction of the second type of traffic participant intersects with the vehicle's travel direction, and that the speed of the second type of traffic participant exceeds a preset speed threshold indicating a fast movement speed, the second type of traffic participant has a higher hazard level at that moment, meaning that the second type of traffic participant is facing a greater danger. In this case, a warning corresponding to the hazard level of the warning region where the second type of traffic participant is located is triggered to better protect against the dominant traffic participant facing a higher level of danger.

In an embodiment, after identifying the traffic participant in the blind spot in the above step 102, it further includes: determining whether there is a target traffic participant among the traffic participants in the blind spot, where there is a barrier between the target traffic participant and the vehicle. Correspondingly, the above step 105 may include: if there is a target traffic participant, then based on the hazard level of the warning region where the remaining traffic participants are located, perform a warning corresponding to the hazard level of the warning region, where the remaining traffic participants include traffic participants in the blind spot other than the target traffic participant.

In an embodiment, there may be a guardrail on the right side of the vehicle, which could separate the current vehicle from traffic participants. The traffic participants separated by the guardrail are considered as target traffic participants, and they belong to the low-risk category. If there are target traffic participants present, they can be ignored during the warning process. Instead, the warning should be based on the hazard level of the warning region where other traffic participants in the blind spot, excluding the target traffic participants, are located.

Figure 4:
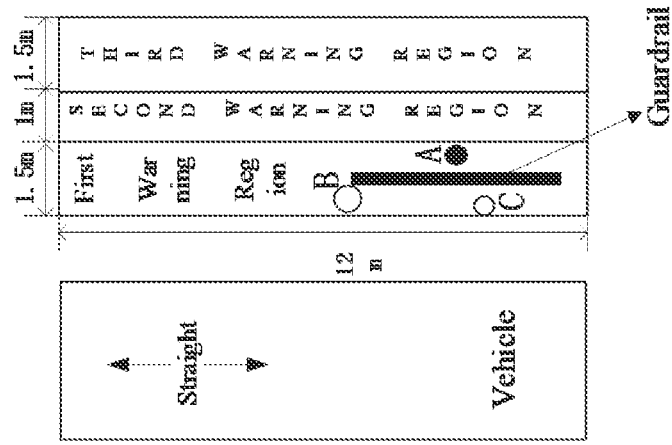
FIG. 4 illustrates a schematic diagram of warning regions with target traffic participants, according to some embodiments.

FIG. 4 illustrates a schematic diagram of warning regions with target traffic participants, according to some embodiments.

In FIG. 4, the current vehicle is traveling straight ahead, and the traffic participant at point A (solid circle) is the target traffic participant, while the traffic participants at points B and C (hollow circles) are the remaining traffic participants mentioned above. Although the traffic participants at points A, B, and C are all located in the first warning region, the traffic participant at point A is considered a low-risk traffic participant because it is separated by a guardrail, whereas the traffic participants at points B and C are considered high-risk traffic participants.

In an embodiment, no warning is given for target traffic participants separated by guardrails, which helps prevent frequent alarms from causing the driver to become numb to the warning information.

Figure 5:
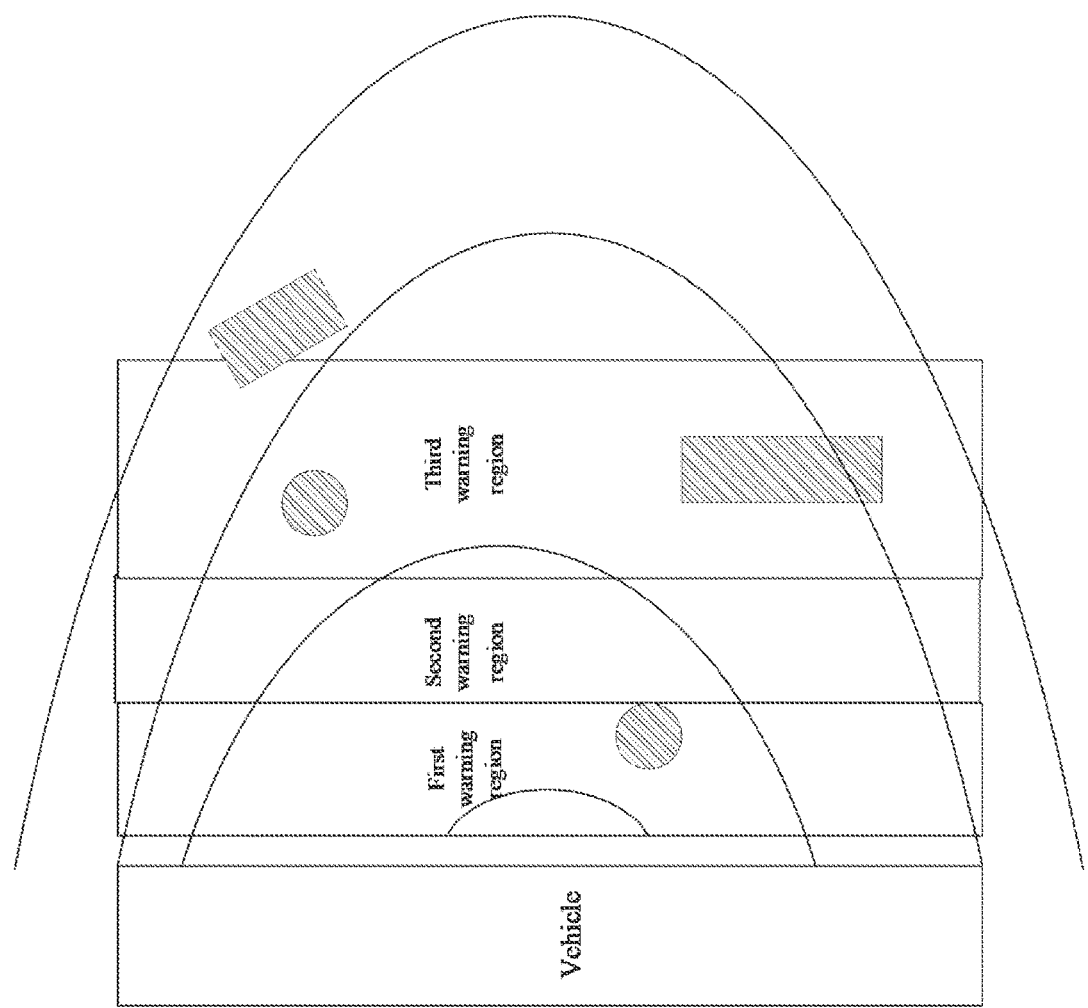
FIG. 5 illustrates a schematic diagram of warning images, according to some embodiments.

FIG. 5 illustrates a schematic diagram of warning images, according to some embodiments.

In an embodiment, the implementation of S105 may include generating a warning image based on the hazard level of the warning region where the traffic participant is located, and displaying the warning image on the vehicle's display screen. In the warning image, the distribution of traffic participants in the blind spot is shown, and different types of traffic participants can be displayed in the warning image with different shapes or colors of icons, allowing the vehicle's driver to clearly see the distribution of different types of traffic participants in the blind spot through the warning image. For example, referring to FIG. 5, where circular shaded boxes in the first warning region and the third warning region represent submissive traffic participants, and a rectangular shaded box in the third warning region represents dominant traffic participants.

In an embodiment, the display parameters of warning regions with different hazard levels in the warning image may vary to highlight the traffic participants in warning regions with higher hazard levels. The display parameters of the warning regions may include: color, transparency, etc.

In an embodiment, the implementation of the above S105 may include: determining the moving speed and moving direction of the traffic participant; when the hazard level of the warning region where the traffic participant is located is at a preset level, if the moving speed of the traffic participant is greater than a preset speed threshold and the moving direction of the traffic participant is towards the vehicle, then increasing the hazard level of the warning region where the traffic participant is located and performing a warning corresponding to the increased hazard level, where the hazard level of the warning region is at the preset level, and the warning region with the preset hazard level is farther from the vehicle than a preset distance. The preset distance can be set according to actual needs to indicate that the warning region is relatively close to the vehicle. The preset speed threshold can be set according to actual needs to indicate that the current moving speed of the traffic participant is relatively fast. The preset level can be a relatively low level of hazard severity.

In an embodiment, referring to FIG. 2 or FIG. 3, the warning region with a preset hazard level can be the third warning region. Although the hazard level of the third warning region is relatively low, when the traffic participant in the third warning region moves fast and its direction is towards the vehicle, indicating a higher level of danger, the hazard level of the warning region where the traffic participant is located can be increased, and a warning corresponding to the increased hazard level can be issued. Assuming the hazard level of the third warning region is level three, the increased hazard level of the third warning region can be level two or level one. In this embodiment, the highest hazard level is level one, followed by level two, and level three is the lowest hazard level.

In an embodiment, by combining the moving speed and moving direction of the traffic participant, increasing the hazard level of the warning region where the traffic participant is located is beneficial for enhancing the accuracy of warnings further by integrating actual traffic conditions.

The division of steps in the above methods is for descriptive purposes only. In implementation, steps can be combined into one or split into multiple steps as long as they involve the same logical relationships.

Figure 6:
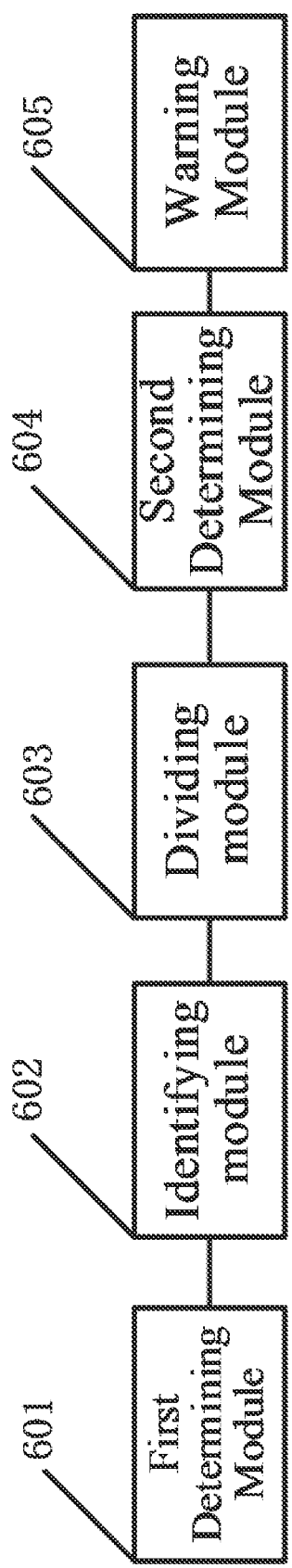
FIG. 6 illustrates a structural schematic diagram of a blind spot warning device, according to some embodiments.

FIG. 6 illustrates a structural schematic diagram of a blind spot warning device, according to some embodiments.

Referring to FIG. 6, the device includes: a first determining module 601 for determining the blind spot of the vehicle during travel; an identifying module 602 for identifying a traffic participant in the blind spot; a dividing module 603 for dividing the blind spot to obtain multiple warning regions, where the multiple warning regions have different hazard levels; a second determining module 604 for determining the warning region among the multiple warning regions in which the traffic participant is located; and a warning module 605 for performing a warning corresponding to the hazard level of the warning region where the traffic participant is located according to the hazard level of the warning region.

In an embodiment, the first determining module 601 is configured to determine the vehicle's body parameters or travel speed; and based on the vehicle's body parameters or travel speed, determine the blind spot of the vehicle during travel.

In an embodiment, the dividing module 603 is configured to determine the division factor of the blind spot, where the division factor includes: the type of the traffic participant or the travel direction of the vehicle; and is configured to divide, according to the division factor, the blind spot to obtain multiple warning regions.

In an embodiment, traffic participants of the same type correspond to respective hazard levels, and different travel directions correspond to respective hazard levels. A dividing module 603 is configured to determine the hazard level corresponding to the type of traffic participant in the blind spot or to determine the hazard level corresponding to the travel direction of the vehicle. Based on the hazard level corresponding to the type of traffic participant or the hazard level corresponding to the travel direction, the blind spot is divided to obtain multiple warning regions corresponding to the type of traffic participant or the travel direction of the vehicle within the blind spot.

In an embodiment, the division factor includes the type of the traffic participant and the travel direction of the vehicle. For the same type of traffic participant, different travel directions each correspond to multiple respective warning regions. When the travel direction of the vehicle is the target travel direction, the first warning region corresponding to the target travel direction has the maximum width among the first warning regions corresponding to different travel directions. The target travel direction is the travel direction with the highest hazard level among the different travel directions. For the same travel direction, different types of traffic participants each correspond to multiple respective warning regions. When the type of the traffic participant is the target type, the first warning region corresponding to the target type of traffic participant has the maximum width among the first warning regions corresponding to different types of traffic participants. The target type of traffic participant is the type of traffic participant with the highest hazard level among the different types of traffic participants. The first warning region is the region closest to the vehicle among the plurality of warning regions.

In an embodiment, for the same type of traffic participant, the higher the hazard level corresponding to the travel direction of the vehicle, the greater the width of the first warning region. For the same travel direction, the higher the hazard level corresponding to the type of the traffic participant, the greater the width of the first warning region.

In an embodiment, the traffic participants in the blind spot include: a first type of traffic participant and a second type of traffic participant, where the hazard level corresponding to the first type of traffic participant is higher than the hazard level corresponding to the second type of traffic participant. The multiple warning regions include: multiple warning regions corresponding to the first type of traffic participant and multiple warning regions corresponding to the second type of traffic participant. A second determining module 604 is configured to determine the warning region in which the first type of traffic participant is located among the multiple warning regions corresponding to the first type of traffic participant; and to determine the warning region in which the second type of traffic participant is located among the multiple warning regions corresponding to the second type of traffic participant.

In an embodiment, the second determining module 604 is configured to determine a first feature point for representing the first type of traffic participant; to determine the warning region in which the first type of traffic participant is located based on whether the first feature point falls within the multiple warning regions corresponding to the first type of traffic participant; to determine a second feature point for representing the second type of traffic participant; and to determine the warning region in which the second type of traffic participant is located based on whether the second feature point falls within the multiple warning regions corresponding to the second type of traffic participant.

In an embodiment, the warning module 605 is configured to perform a warning corresponding to a hazard level of the warning region when the traffic participant is distributed in one warning region; when the traffic participant is distributed in multiple warning regions, determining the highest hazard level among the hazard levels of the multiple warning regions, and performing a warning corresponding to the highest hazard level.

In an embodiment, the traffic participants in the blind spot include: a first type of traffic participant and a second type of traffic participant, and the multiple warning regions include: multiple warning regions corresponding to the first type of traffic participant and multiple warning regions corresponding to the second type of traffic participant. The hazard level corresponding to the first type of traffic participant is higher than the hazard level corresponding to the second type of traffic participant. The warning module 650, when the traffic participant is distributed in multiple warning regions, determines the highest hazard level among the hazard levels of the multiple warning regions, including: when the target warning region corresponding to the first type of traffic participant contains the first type of traffic participant, and the target warning region corresponding to the second type of traffic participant contains the second type of traffic participant, the hazard level of the target warning region corresponding to the first type of traffic participant is determined as the highest hazard level, where the target warning region is one of the multiple warning regions.

In an embodiment, the identifying module 602 is configured to collect data on the blind spot through a blind spot LiDAR so as to obtain point cloud data, where the blind spot LiDAR is positioned on the right side of the vehicle body; and based on the point cloud data, the traffic participants in the blind spot are identified.

In an embodiment, the identifying module 602 identifies traffic participants in the blind spot based on the point cloud data, including: inputting the point cloud data into a pre-trained recognition model, and outputting the traffic participants present in the blind spot, where the recognition model is trained based on historical data collected by the blind spot LiDAR, and the historical data includes point cloud data of different types of traffic participants.

In an embodiment, the identifying module 602 is configured to determine whether there is a target traffic participant among the traffic participants in the blind spot after identifying the traffic participants in the blind spot, where there is a barrier between the target traffic participant and the vehicle. The warning module 605 is configured to, if the target traffic participant exists, perform a warning corresponding to the hazard level of the warning region where the remaining traffic participants are located based on the hazard level of the warning region, where the remaining traffic participants include traffic participants in the blind spot other than the target traffic participant.

In an embodiment, the warning module 605 is configured to generate a warning image based on the hazard level of the warning region where the traffic participant is located; and to display the warning image on the display screen of the vehicle.

In an embodiment, the warning module 605 is configured to determine the moving speed and moving direction of the traffic participant; when the hazard level of the warning region where the traffic participant is located is at a preset level, if the moving speed of the traffic participant is greater than a preset speed threshold and the moving direction of the traffic participant is towards the vehicle, then the hazard level of the warning region where the traffic participant is located is increased, and a warning corresponding to the increased hazard level is performed, where the warning region with the hazard level as the preset level is farther from the vehicle than a preset distance.

FIG. 7 illustrates a structural schematic diagram of an electronic device, according to some embodiments.

Referring to FIG. 7, the electronic device includes a memory 701 and a processor 702, where the memory 701 stores an executable program code, and the processor 702 is used to call and execute the executable program code to perform a blind spot warning method.

The present embodiment can divide the functional modules of electronic devices according to the method examples described above. For example, functions can correspond to various functional modules, or two or more functions can be integrated into one processing module. The integrated modules mentioned above can be implemented in hardware form. The division of modules in this embodiment is illustrative, representing a logical functional division.

In an embodiment, the electronic device may include: a first determining module, an identifying module, a dividing module, a second determining module, and a warning module. It should be noted that all relevant content of the steps involved in the method embodiments can refer to the functional descriptions of the corresponding functional modules.

The electronic device provided in this embodiment is used to execute the blind spot warning method embodiments described above, thereby achieving the same effect as the method implementation described above.

In an embodiment, an electronic device may include a processing module and a storage module. The processing module can be used to control and manage the operations of the electronic device. The storage module can support the execution of program codes and data exchange by the electronic device.

The processing module can be a processor or controller, which can implement or execute various exemplary logical blocks, modules, and circuits in conjunction with the disclosed content of the present application. The processor can also be a combination that implements computational functions, such as including one or more combinations of microprocessors, digital signal processing (DSP), and microprocessors, etc. The storage module can be a memory.

In an embodiment, a non-transitory computer-readable storage medium is provided, where the non-transitory computer-readable storage medium stores a computer program, and when the computer program is executed on a computer, the method embodiments are performed as described in the present embodiment.

In an embodiment, a computer program product is provided, where when the computer program product is executed on a computer, the computer performs the above steps to implement a blind spot warning method as described in the above embodiments.

In an embodiment, the electronic device can be a chip, component, or module, which may include interconnected processor and memory, where the memory is used to store instructions. When the electronic device is running, the processor can call and execute the instructions to enable the chip to perform one of the blind spot warning methods as described in the embodiments above.

What is claimed is:

1. A blind spot warning method, comprising:
   determining a blind spot of a vehicle during travel;
   identifying a traffic participant in the blind spot;
   dividing the blind spot to obtain a plurality of warning regions, wherein the plurality of warning regions has different hazard levels;
   determining a warning region from the plurality of warning regions in which the traffic participant is located; and
   performing a warning corresponding to a hazard level of the warning region according to a hazard level of the warning region in which the traffic participant is located, comprising:
   when it is identified that the traffic participant in the blind spot includes a first type of traffic participant and a second type of traffic participant, performing a warning corresponding to a hazard level of the warning region according to a hazard level of the warning region in which the first type of traffic participant is located; and a hazard level corresponding to the first type of traffic participant is higher than a hazard level corresponding to the second type of traffic participant.

2. The method according to claim 1, wherein determining the blind spot of the vehicle during travel includes:
   determining a vehicle body parameter or a travel speed of the vehicle; and
   determining the blind spot of the vehicle during travel according to the vehicle body parameter or the travel speed.

3. The method according to claim 1, wherein dividing the blind spot to obtain a plurality of warning regions includes:
   determining a division factor of the blind spot, wherein the division factor includes: a type of the traffic participant or a travel direction of the vehicle; and
   dividing the blind spot to obtain a plurality of warning regions according to the division factor.

4. The method according to claim 3, wherein different types of traffic participants correspond to respective hazard levels, and different travel directions correspond to respective hazard levels;
   wherein dividing the blind spot to obtain a plurality of warning regions according to the division factor includes:
   determining a hazard level corresponding to a type of the traffic participant in the blind spot, or determining a hazard level corresponding to a travel direction of the vehicle; and
   dividing the blind spot to obtain a plurality of warning regions corresponding to the type of the traffic participant or the travel direction of the vehicle according to the hazard level corresponding to the type of the traffic participant or the hazard level corresponding to the travel direction.

5. The method according to claim 4, wherein the division factor includes the type of the traffic participant and the travel direction of the vehicle;
   wherein for the same type of traffic participant, multiple warning regions are respectively corresponding to different travel directions; when the travel direction of the vehicle is a target travel direction, a first warning region corresponding to the target travel direction has the maximum width in first warning regions corresponding to the different travel directions; and the target travel direction is the travel direction with the highest hazard level in the different travel directions;
   wherein for the same type of travel direction, multiple warning regions are respectively corresponding to different types of traffic participants; when the type of the traffic participant is a target type, a first warning region corresponding to the target type of the traffic participant has the maximum width in first warning regions corresponding to the different types of traffic participants; and the target type of the traffic participant is the type of the traffic participant with the highest hazard level in the different types of traffic participants;
   the first warning region is a region closest to the vehicle in the plurality of warning regions.

6. The method according to claim 5, wherein for the same type of traffic participant, the higher the hazard level corresponding to the travel direction of the vehicle, the greater the width of the first warning region;
   wherein for the same type of travel direction, the higher the hazard level corresponding to the type of the traffic participant, the greater the width of the first warning region.

7. The method according to claim 1, wherein the traffic participant in the blind spot includes: a first type of traffic participant and a second type of traffic participant, and a hazard level corresponding to the first type of traffic participant is higher than a hazard level corresponding to the second type of traffic participant; and the plurality of warning regions include: multiple warning regions corresponding to the first type of traffic participant and multiple warning regions corresponding to the second type of traffic participant;
   wherein determining a warning region from the plurality of warning regions in which the traffic participant is located:
   determining a warning region in which the first type of traffic participant is located in the multiple warning regions corresponding to the first type of traffic participant;
   determining a warning region in which the second type of traffic participant is located in the multiple warning regions corresponding to the second type of traffic participant.

8. The method according to claim 7, wherein determining the warning region in which the first type of traffic participant is located in the multiple warning regions corresponding to the first type of traffic participant includes:
   determining a first feature point for representing the first type of traffic participant; and
   determining a warning region in which the first type of traffic participant is located according to whether the first feature point falls within the multiple warning regions corresponding to the first type of traffic participant;
   wherein determining the warning region in which the second type of traffic participant is located in the multiple warning regions corresponding to the second type of traffic participant includes:
   determining a second feature point for representing the second type of traffic participant; and
   determining a warning region in which the second type of traffic participant is located according to whether the second feature point falls within the multiple warning regions corresponding to the second type of traffic participant.

9. The method according to claim 1, wherein performing a warning corresponding to a hazard level of the warning region according to a hazard level of the warning region in which the traffic participant is located includes:

wherein when the traffic participant is distributed in one warning region, performing a warning corresponding to a hazard level of the one warning region;

wherein when the traffic participant is distributed in multiple warning regions, determining a highest hazard level in hazard levels of the multiple warning regions, and performing a warning corresponding to the highest hazard level.

10. The method according to claim 1, wherein performing a warning corresponding to a hazard level of the warning region according to a hazard level of the warning region in which the traffic participant is located includes:

determining a moving speed and a moving direction of the traffic participant;

wherein when a hazard level of the warning region in which the traffic participant is located is a preset level, increasing the hazard level of the warning region in which the traffic participant is located when the moving speed of the traffic participant is greater than a preset speed threshold and the moving direction of the traffic participant is towards the vehicle, and performing a warning corresponding to the increased hazard level; and the hazard level of the warning region is the preset level, and the warning region is farther from the vehicle than a preset distance.

11. An electronic device, comprising:

a memory, configured to store an executable program code; and a processor, configured to call and run the executable program code from the memory, so that the electronic device performs the method according to claim 1.

* * * * *